United States Patent
Ramesohl et al.

(10) Patent No.: US 6,287,110 B1
(45) Date of Patent: Sep. 11, 2001

(54) SYSTEM FOR THE THERMAL TREATMENT OF MEAL-LIKE RAW MATERIALS

(75) Inventors: Hubert Ramesohl, Bergisch Gladbach; Michael Brachthäuser, Dormagen; Andreas Hand, Köln; Stephan Kuhnke, Erftstadt, all of (DE)

(73) Assignee: KHD Humboldt Wedag AG, Cologne (DE)

( * ) Notice: Subject to any disclaimer, the term of this patent is extended or adjusted under 35 U.S.C. 154(b) by 0 days.

(21) Appl. No.: 09/496,806

(22) Filed: Feb. 2, 2000

(30) Foreign Application Priority Data

Feb. 2, 1999 (DE) .............................................. 199 03 954

(51) Int. Cl.$^7$ .................................................... F27B 15/00
(52) U.S. Cl. ................................ 432/14; 432/58; 432/106
(58) Field of Search ................................ 432/14, 106, 58, 432/105

(56) References Cited

U.S. PATENT DOCUMENTS 5,713,734 * 2/1998 Makris et al. ........................ 432/106

FOREIGN PATENT DOCUMENTS 0222044 5/1987 (EP) .
0526770 2/1993 (EP) .

OTHER PUBLICATIONS

World Cement, "High Efficiency Calciner"; Oct., 1998.

* cited by examiner

Primary Examiner—Jiping Lu
(74) Attorney, Agent, or Firm—Sonnenschein Nath & Rosenthal

(57) ABSTRACT

In order to create a calcinator preceding the rotary tubular kiln and equipped with secondary firings in which inert fuels that are difficult to ignite or, respectively, difficult to burn (secondary fuels) can be beneficially disposed of by burning for the purpose of calcination of the cement raw meal and a complete burn-out of CO gas strands and other fuel constituents, as well as an exhaust gas with low $No_x$, are nonetheless assured for cement clinker production lines, the tertiary air channel in the region of the calcination unit is fashioned as a combustion chamber that expands the channel cross-section and through which the suspension flows from bottom to top. Tertiary air having a torsion component as well as an easily ignitable fuel is centrally introduced at the lower end of the combustion chamber, whereby a high-temperature zone that extends centrally from bottom to top and has a hot core flame proceeds from this burning location. An inert fuel that is difficult to ignite or, respectively, difficult to burn (secondary fuel) is introduced into the high-temperature zone and is burned and, thus, is usefully disposed of for the purpose of calcining the raw meal.

17 Claims, 1 Drawing Sheet

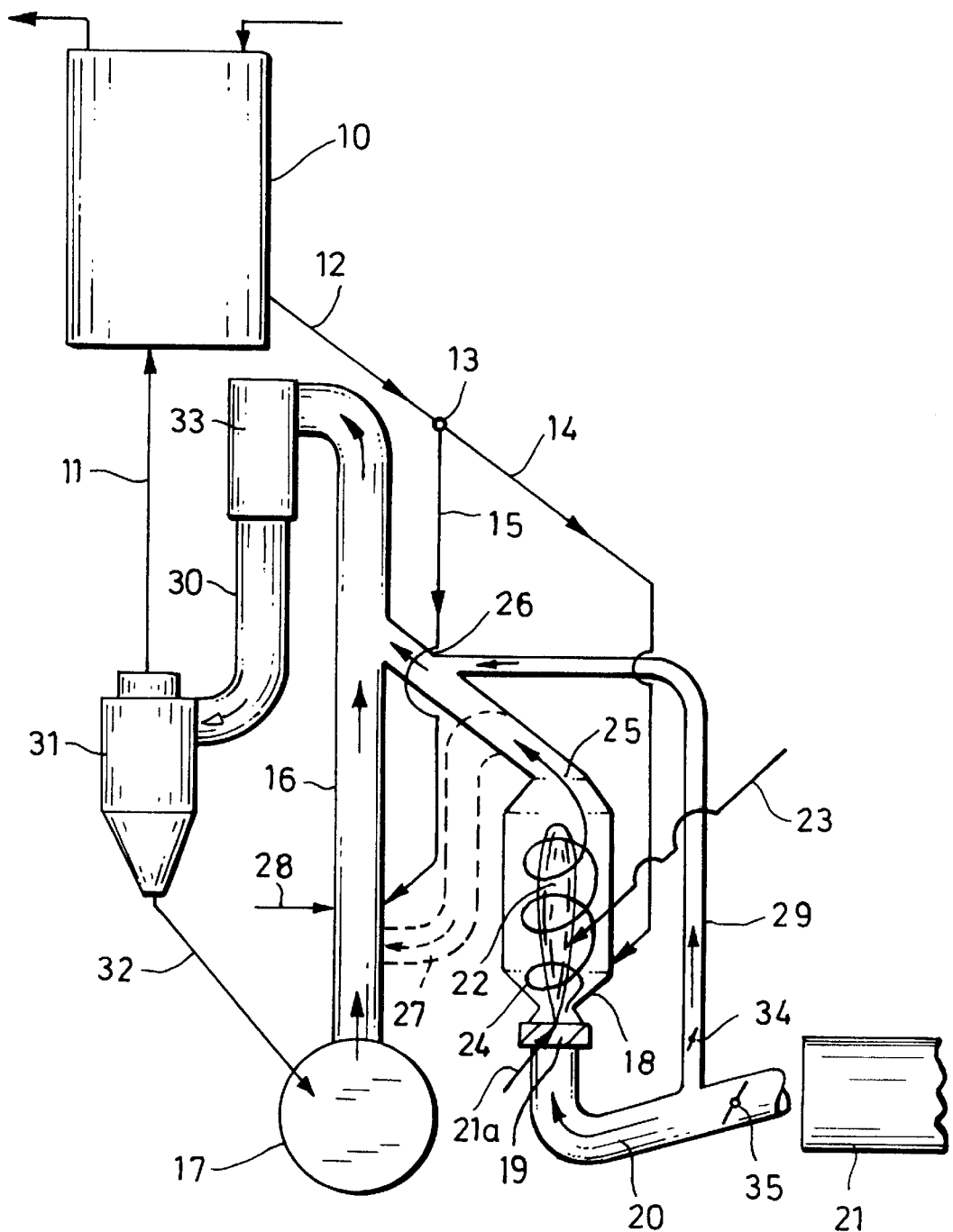

SYSTEM FOR THE THERMAL TREATMENT OF MEAL-LIKE RAW MATERIALS

BACKGROUND OF THE INVENTION

The invention is directed to a system for the thermal treatment of meal-like raw materials, particularly in the manufacture of cement clinker from raw meal, whereby the raw meal is thermally treated in a burning process by pre-heating, calcining, sintering and cooling, and the exhaust gas stream of the sintering unit (rotary kiln) and an exhaust air stream (tertiary air) of the cooling unit (clinker cooler) are used in such a way for calcination of the raw meal in the calcining unit that at least one burning location is present both in the exhaust gas channel of the rotary kiln as well as in the tertiary air channel, whereby the gas/raw meal/fuel suspension coming from both channels is redirected in the calcining unit and is introduced into the lowest cyclone of the suspension-type cyclone pre-heater system for the purpose of separating the calcined raw meal from the gas stream.

Systems for the manufacture of cement clinker from raw meal of the type set forth above having a calcining stage that precedes the rotary tubular kiln and that is equipped with secondary firings must be in the position of producing a raw meal calcined to a great extent before introduction into the rotary tubular kiln. At the same time, the builders and operators of cement clinker production lines are confronted with stricter and stricter demands for low emission values of pollutants such as $NO_x$ and CO.

For reducing such noxious emissions, it is known (for example, EP-B-0 222 044 as well as EP-B-0 526 770) in cement clinker production systems of the type initially cited to burn the fuel in the ascending rotary kiln exhaust gas conduit sub-stoichiometrically, i.e. starved for oxygen, for the purpose of creating a CO-containing reduction zone for reduction of the pollutant $NO_x$ that, in particular, has been formed due to the high-temperature burning in the rotary tubular kiln (thermic $NO_x$). In the neighboring channel, what is referred to as the tertiary air channel and through which a portion of the hot clinker cooler exhaust is conducted, fuel is burned over-stoichiometrically, i.e. with an excess of oxygen. The heat released in the fuel combustion is used for calcination of the raw meal in any case. As viewed in a downstream direction of the suspension flow, the CO not consumed in the $NO_x$ reduction zone is burned with excess oxygen from the tertiary air channel after being merged with the rotary kiln exhaust gas channel, whereby the residual burning is additionally promoted by the flow redirection of the suspension in the calcining unit.

Whereas the firing in the rotary tubular kiln is a high-temperature combustion with long burner flame, whereby mainly thermic $NO_x$ enters into the exhaust, the temperature in the usually flameless burning in the calcination unit does not exceed the calcination temperature of approximately 850° C., whereby it is mainly fuel $NO_x$ that arises. This burning temperature/calcination temperature, however, is too low for burning inert fuels that are difficult to ignite or, respectively, difficult to burn (what are referred to as secondary fuels) such as, for example, inferior coal, etc., so that such substances have been hitherto burned in the rotary tubular kiln itself or were not capable of being utilized in the production of cement clinker.

It is also known (trade periodical "World Cement", October 1998, pages 83–88) to burn inert secondary fuels outside the rotary tubular kiln, namely in a vertically arranged, cylindrical calcining reactor, through which the suspension flows from bottom to top. In this modification, wherein the raw meal is introduced in two separate height levels and the fuel is introduced into the calcining reactor at the bottom, this functions in the fashion of a fluidized bed reactor; for dependable operation thereof given utilization of a large-sized secondary fuel, it would be necessary to grind the secondary fuel. Specific measures are not implemented for achieving low $NO_x$ emissions. In another known modification, a vertically arranged, cylindrical calcining combustion chamber has the tertiary air/raw meal/fuel suspension flowing through it from top to bottom. Inert fuels are thereby employed. A central flame, which extends from top to bottom in the combustion chamber, heats the entire reaction space such (for example, 1000° C.) that the substances that are difficult to burn ignite better. Apart therefrom that the inert fuels—particularly when they are not ground—drop rapidly from top to bottom through the combustion chamber with short dwell time, so that they do not have enough time to completely burn out, this known calcination system also does not address specific measures for achieving an optimally low-pollution burning of secondary fuels outside the rotary tubular kiln given reduced emissions of pollutants such as, in particular, $NO_x$ and CO.

SUMMARY OF THE INVENTION

In cement clinker production lines of the type described above, the invention is based on the object of creating a calcinator preceding the rotary tubular kiln and equipped with secondary firings in which inert fuels that are difficult to ignite or, respectively, difficult to burn (secondary fuels) can be beneficially disposed of by burning for the purpose of calcination of the cement raw meal and a complete burn-out of CO gas strands and other fuel constituents as well as an exhaust gas with low $NO_x$ are nonetheless assured.

A first characteristic of the inventive calcination unit is that the tertiary air channel coming from the clinker cooler is fashioned—in the region of the calcination unit—as a combustion chamber that expands the channel cross section and through which the cooler exhaust/raw meal/fuel suspension flows from bottom to top, and at whose lower end the tertiary air enters with a torsion component. An easily ignitable fuel is also centrally introduced at this lower combustion chamber end, whereby a high-temperature zone that extends centrally from bottom to top and has a hot core flame proceeds from this burning location. An inert fuel that is difficult to ignite or, respectively, difficult to burn (secondary fuel) is introduced into the flame space of the high-temperature zone of the combustion chamber, this dependably igniting thereat and burning and thus being disposed of At least a sub-stream of the raw meal from the second-lowest cyclone stage of the suspension-type cyclone pre-heater systems is introduced in the peripheral space between the flame space and the wall of the combustion chamber. In this peripheral space, the raw meal is entrained by the tertiary air entering with a torsion component and is conveyed from bottom to top on a spiral path around the hot flame space with the tertiary air stream in the combustion chamber and is thereby calcined to a high degree. In contrast to a combustion chamber with a material flow from top to bottom, particularly the coarser parts dwell longer in the reaction space given the suspension flow directed from bottom to top in the inventively arranged combustion chamber, i.e. the dwell time both for the burning of the secondary fuel in the hot flame space as well as for the calcination of the raw meal in the peripheral space between the flame space and the wall of the combustion chamber is noticeably lengthened, which ultimately leads to an optimally complete burn-out as well as to a high degree of calcination. At the same time, the solid material transported upward pneumatically on spiral paths in the peripheral space between the hot flame space and the wall of the combustion chamber acts as thermal insulation and, thus, as protection against thermal overload of the wall of the combustion chamber and against caking.

The advantage of the long dwell time in the combustion chamber connected with the suspension flow proceeding from bottom to top in the inventive combustion chamber is especially true of the coarse-sized parts of the secondary fuel introduced into the combustion chamber, which need not be finely ground before being introduced. If coarse-sized parts of the secondary fuel happen to drop down after being introduced into the combustion chamber, they have the opportunity of being entrained by the tertiary air stream introduced with torsion into the combustion chamber from below and of being transported up on spiral paths with a long dwell time. As a result of the effect of centrifugal force, the coarser-sized solid fuel components are displaced more and more to the periphery of the chamber, where, with long dwell time, they first generate a CO-containing atmosphere due to a degasification, this atmosphere being suitable for decomposing the pollutant $NO_x$ contained in the exhaust by reduction. Over and above this, the secondary fuel introduced into the combustion chamber can be intentionally sub-stoichiometrically burned, i.e. starved for oxygen, for the purpose of creating an even larger CO-containing reduction zone for the reduction of the pollutant $NO_x$. As viewed downstream in the direction of the suspension flow, the CO not consumed in the $NO_x$ reduction zone is then burned with combustion air that, in the form of tertiary air, is branched off from the tertiary air conduit coming from the clinker cooler and is introduced into the calciner exhaust via at least one branch conduit before the flowing suspension is redirected for enhancing the complete burn-out as well as the degree of calcination of the raw meal in the calciner, whereby a fluidizing chamber or, respectively, mixing chamber for intimate blending of the gas/raw meal/fuel suspension can also be additionally arranged in the region of the flow redirection.

BRIEF DESCRIPTION OF THE DRAWINGS

The invention and further features and advantages thereof are explained in greater detail on the basis of the exemplary embodiment schematically shown in the drawing.

DETAILED DESCRIPTION OF THE PREFERRED EMBODIMENTS

The drawing shows a schematic illustration of the calcining stage or, respectively, the calciner of a system for manufacturing cement clinker from raw cement meal that is delivered at the top to a suspension-type cyclone pre-heater system 10, where it successively migrates through a plurality of suspension-type cyclone heat exchangers in a combine equiflow-counterflow to the hot exhaust gas 11 of the calcining stage in order to be separated out of the gas stream 11 in the penultimate (second-lowest) cyclone and to be divided onto the two product admission conduits 14 and 15 in the raw meal shunt 13 via the delivery conduit 12. After flowing through the uppermost cyclone, the exhaust gas 11 cooled at the raw cement meal upwardly departs the pre-heating stage 10 of the cement clinker production line. Although the entire system is not illustrated, U.S. Pat. Nos. 4,747,879 and 5,098,285 disclose generally a complete system, and the disclosures of those references are incorporated herein by reference.

Whereas the raw meal conduit 15 discharges into the ascending exhaust gas conduit or, respectively, into the rotary kiln exhaust channel 16 of the rotary tubular kiln 17, the raw meal conduit 14 discharges into a combustion chamber 18, at whose lower admission opening 19 a hot cooler exhaust flows in via a tertiary air conduit 20 brought in from the clinker cooler 21. The combustion chamber has a clearly expanded cross section compared to the tertiary air conduit 20, and a gas/raw meal/fuel suspension flows through it from bottom to top. To that end, an easily ignitable fuel 21a is centrally introduced at the lower end of the combustion chamber 18 in the region of the admission opening 19 at which the tertiary air enters with a torsion component, whereby a high-temperature zone that extends centrally from bottom to top and has a hot core flame 22 proceeds from this burning location in the combustion chamber 18. An inert fuel 23 that is difficult to ignite or, respectively, difficult to burn (secondary fuel) is introduced into the flame space 22 of the high-temperature zone of the combustion chamber 18, is burned and, thus, disposed of beneficially. The raw meal sub-stream 14 is introduced into the lower region of the peripheral space between the flame space 22 and the wall of the combustion chamber 18. A comparatively low structural height of the inventive calcining chamber or, respectively, of the entire calciner therefore also derives.

As schematically shown in the drawing, the tertiary air introduced from below into the combustion chamber 18 with torsion displaces the raw meal 14 toward the periphery of the chamber as a result of the centrifugal forces, and the raw meal 14 is pneumatically conveyed from bottom to top to the upper outlet 25 of the combustion chamber in the peripheral space between the flame space 22 and the chamber wall with a very long dwell time. On its spiral path through the combustion chamber from bottom to top, the raw meal 14 is calcined to a high degree and it simultaneously protects the wall of the combustion chamber 18 against overheating.

The easily ignited fuel 21a is over-stoichiometrically burned with excess oxygen in the combustion chamber 18. The inert secondary fuel 23 can also be burned with excess oxygen. At least the coarser particles of the secondary fuel 23 are likewise displaced to the periphery, where they de-gasify comparatively slowly and develop CO, which has a reducing effect on the $NO_x$ contained in the exhaust gas. However, the ratio of oxygen of the tertiary air 20 to the secondary fuel 23 can also be intentionally set such with the setting elements 34 or, respectively, 35 (to be described later) that the secondary fuel burns starved for oxygen for the purpose of an intensified formation of a CO-containing reduction zone, which is then even more in the position of largely neutralizing the pollutant $NO_x$ contained in the exhaust gas by decomposition. If coarse parts of the introduced secondary fuel 23 drop down in the combustion chamber, then it is precisely these that experience a long dwell time in the combustion chamber because they are seized by the tertiary air stream introduced from below with torsion and are again entrained upward by pneumatic conveying.

Via an obliquely, upwardly inclined conduit 26 or, alternatively thereto, via a downwardly inclined pipeline arc 27 shown with broken lines, the outlet 25 of the combustion chamber 18 is connected to the rotary kiln exhaust gas channel 16 that is supplied both with the raw meal sub-stream 15 as well as with fuel 28. The fuel 28 utilized in this burning location of the rotary kiln exhaust gas channel can also be sub-stoichiometrically burned starved for oxygen for the purpose of forming a CO-containing reduction zone or, respectively, CO gas strands for the reduction of the pollutant $NO_x$ contained in the rotary kiln exhaust gas. As viewed downstream of the combustion chamber 18 as well as of the burning location 28 in the rotary kiln exhaust channel, combustion air that is branched off from the tertiary air conduit 20 coming from the clinker cooler via at least one branch conduit 29 enters into the tertiary air channel/rotary kiln exhaust channel.

As also proceeds from the drawing, a fluidizing chamber or, respectively, mixing chamber 33 for intimate blending of the gas/raw meal/fuel suspension can also be arranged in the calcining unit in the region of the redirection from the ascending rotary kiln exhaust gas channel 16 by approximately 180° C. into the descending pipeline branch 30, which leads into the lowest cyclone 31 for separating the cement raw meal 32 calcined to a high degree from the exhaust gas stream 11, as a result whereof the complete burn-out of CO gas strand that may still be present as well as of potentially existing, other fuel constituents is dependably assured. The mixing chamber 33 can comprise a tangential admission and a tangential outlet; however, it can also comprise an upper, tangential suspension admission as well as a central, lower discharge opening.

For controlling the division of the tertiary air 20 into the combustion chamber 18 as well as into the branch conduit 29 in the desired ratio, setting elements such as flaps 34 or, respectively, slides 35, etc., can also be arranged in the conduits 20 or, respectively, 29. Such an amount of air for the complete burn-out can thereby be branched off from the tertiary air via conduit 29 that the fuel that would not burn with oxygen excess in the combustion chamber 18 if tertiary air were not branched off burns with oxygen starvation given tertiary air that is branched off.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

What is claimed is:

1. A system for thermal treatment of meal-like raw materials, in the manufacture of cement clinker from raw meal, whereby the raw meal is thermally treated in a burning process by pre-heating, calcining, sintering and cooling, and an exhaust gas stream of a sintering unit in the form of a rotary kiln and a tertiary exhaust air stream flowing through a tertiary air channel leading from a cooling unit are used in such a way for calcination of the raw meal in a calcining unit that at least one burning location is present both in an exhaust gas channel of the rotary kiln as well as in the tertiary air channel, whereby a gas/raw meal/fuel suspension coming from both channels is redirected in the calcining unit and is introduced into a lowest cyclone of a suspension-type cyclone pre-heater system for the purpose of separating a calcined raw meal from the gas stream, wherein:

a) the tertiary air channel in the region of the calcining unit, is fashioned as a combustion chamber that expands the tertiary air channel cross section and through which the suspension flows from bottom to top;

b) at a lower end of the combustion chamber at which the tertiary air enters with a torsion component, an easily ignitable fuel is centrally introduced, whereby a high-temperature zone that extends centrally from bottom to top and has a hot core flame proceeds from this burning location;

c) a secondary fuel is introduced into a flame space of the high-temperature zone of the combustion chamber an is burned; and d) at least a sub-stream of the raw meal from a second-lowest cyclone stage of the suspension-type cyclone pre-heater system is introduced in a peripheral space between the flame space and a wall of the combustion chamber.

2. A system according to claim 1, wherein via an obliquely upwardly inclined conduit or via a downwardly inclined pipeline arc, an outlet of the combustion chamber is connected to the exhaust gas channel of the rotary kiln supplied with fuel and at least a raw meal sub-stream.

3. A system according to claim 1, wherein the secondary fuel utilized in the combustion chamber of the tertiary air channel and/or the fuel utilized in the burning location of the rotary kiln exhaust gas channel is burned sub-stoichiometrically starved for oxygen.

4. A system according to claim 1, wherein combustion air that is branched off via at least one branch conduit from the tertiary air conduit coming from the clinker cooler enters into the tertiary air channel/rotary kiln exhaust gas channel downstream from the combustion chamber as well as downstream from the burning location in the rotary kiln exhaust gas channel.

5. A system according to claim 1, wherein a fluidizing chamber or, respectively, mixing chamber for intimate blending of the gas/raw meal/fuel suspension is arranged in the calcining unit in the region of a flow redirection.

6. A method of thermally treating meal-like raw materials comprising the steps:

providing a sintering unit with an inlet for receiving a stream of raw-meal and an exhaust gas channel for exhausting a stream of exhaust gases;

providing a suspension-type cyclone preheater system for separating calcined raw material from a gas stream and comprising at least two cyclone separator units in series;

providing a clinker cooler for cooling sintered material received from said sintering unit and providing a flow of air into said clinker cooler to provide said cooling, and an outlet conduit for exhausting air from said clinker cooler in a tertiary air stream;

providing a combustion chamber in said clinker cooler outlet conduit with a lower air inlet and an upper exhaust outlet;

directing said tertiary air stream into said combustion chamber lower air inlet in a path oblique from vertical such that said air stream flowing in said combustion chamber will swirl;

introducing an easily ignitable fuel centrally into said lower air inlet of said combustion chamber and igniting said fuel to form a high-temperature zone that extends centrally in said combustion chamber from bottom to top with a hot core flame, introducing a secondary fuel into said high-temperature zone in said combustion chamber;

introducing at least a substream of raw meal into a lower end of said combustion chamber to be pneumatically conveyed from bottom to top of said combustion chamber; and directing an exhaust from said combustion chamber upper exhaust outlet to combine with said exhaust from said sintering unit.

7. A method according to claim 6, including the step of burning said primary fuel super stochiometrically.

8. A method according to claim 7, including the step of burning said secondary fuel substociometrically in said combustion chamber and thereafter supplying additional air to said exhaust outlet downstream of said combustion chamber for further combustion of said secondary fuel.

9. A system for the thermal treatment of meal-like raw materials, comprising:

a sintering unit having an inlet for said materials, a burning location and an exhaust outlet conduit;

a cooling unit for sintered materials received from said sintering unit having an exhaust outlet conduit for tertiary air comprising a tertiary air conduit;

a calcining unit comprising a portion of said tertiary air conduit and a combustion chamber formed in said tertiary air conduit providing a burning location, with an inlet at a lower end for a primary fuel, an inlet at said lower end for said tertiary air, an inlet near said lower end for at least a sub-stream of said meal-like raw materials from a second-lowest cyclone stage of said suspension-type cyclone preheater system, an inlet for a secondary fuel, and an outlet conduit at a top end for exhaust of a gas/raw meal/fuel suspension;

a high-temperature zone extending centrally in a direction from bottom to top in said combustion chamber and including hot core flame when said primary fuel is ignited;

said inlet for said tertiary air to said combustion chamber being arranged to introduce said secondary fuel into said high-temperature zone, said inlet for said at least a sub-stream of said meal-like raw materials in said combustion chamber being arranged to introduce said meal-like raw materials in a peripheral space between said flame space and a wall of said combustion chamber;

said calcining unit further comprising said sintering unit exhaust outlet conduit which is supplied with an inlet for a fuel and an inlet for at least a sub-stream of said meal-like raw material from said second lowest cyclone stage, said exhaust outlet conduit of said sintering unit and said outlet conduit of said calcining unit merging into a single outlet conduit; and said single outlet conduit leading to a lowest cyclone of said suspension-type cyclone pre-heater system.

10. A system according to claim 9, wherein said exhaust outlet of said sintering unit is provided with fuel and at least a sub-stream of said meal-like raw materials and said outlet conduit of said calcining unit is connected to said exhaust outlet of said sintering unit via an inclined conduit.

11. A system according to claim 10, wherein said inclined conduit is angled upwardly from said combustion chamber to said exhaust outlet of said sintering unit.

12. A system according to claim 10, wherein said inclined conduit is angled downwardly from said combustion chamber to said exhaust outlet of said sintering unit.

13. A system according to claim 9, wherein said secondary fuel utilized in said combustion chamber of said tertiary air channel is burned sub-stoichiometrically starved for oxygen.

14. A system according to claim 9, wherein said fuel utilized in the burning location of the rotary kiln exhaust gas channel is burned sub-stoichiometrically starved for oxygen.

15. A system according to claim 9 wherein combustion air is branched off via at least one branch conduit from said tertiary air conduit and enters into the calcining unit downstream from said combustion chamber.

16. A system according to claim 9, wherein combustion air is branched off via at least one branch conduit from said tertiary air conduit and enters said sintering unit exhaust outlet conduit downstream from a burning location in said sintering unit exhaust outlet conduit.

17. A system according to claim 9, wherein said single outlet conduit includes a redirecting region including a mixing chamber for intimate blending of the gas/raw meal/fuel suspension flowing from said sintering unit and said calcining unit.

* * * * *